United States Patent
Li

Patent Number: 5,885,003
Date of Patent: Mar. 23, 1999

[54] ROTARY AND ANGULAR MOVEMENT BALANCEABLE ASSEMBLY

[76] Inventor: Alvin Yi Li, 385 S. Lemon Ave., #E152, Walnut, Calif. 91789

[21] Appl. No.: 24,006

[22] Filed: Feb. 14, 1998

Related U.S. Application Data

[62] Division of Ser. No. 624,994, Mar. 29, 1996, Pat. No. 5,795,078.

[51] Int. Cl.[6] ..................................................... F16C 19/00
[52] U.S. Cl. .................................................................. 384/2
[58] Field of Search .................................. 384/2, 498, 45, 384/490, 497

[56] References Cited

U.S. PATENT DOCUMENTS

| | | | |
|---|---|---|---|
| 4,934,840 | 6/1990 | Paret | 384/2 |
| 5,190,000 | 3/1993 | Van Schaik et al. | 384/2 |

Primary Examiner—Lenrd A. Footland
Attorney, Agent, or Firm—David and Raymond; Raymond Y. Chan

[57] ABSTRACT

A rotary and angular movement balanceable assembly includes a first balancer member having concave inner race surface and defining a receiving cavity, a second balancer member disposed in the receiving cavity having a convex outer race surface, a ball bracket mounted inside the receiving cavity, and a plurality of balls retained by the ball bracket in such manner that each ball is in rolling contact with the concave inner race surface of the first balancer member and the convex outer race surface of the second balancer member. Thereby, the rotary and angular movement balanceable assembly is installed between a thrust receiving unit and a thrust applying unit so as to rotatably support the thrust applying unit and enable the thrust applying unit to have both rotary and angular movement while a loading force is applied by the thrust applying unit to the thrust receiving unit.

16 Claims, 11 Drawing Sheets

ROTARY AND ANGULAR MOVEMENT BALANCEABLE ASSEMBLY

CROSS REFERENCE OF RELATED ART

This application is a divisional application of an allowed original application, Ser. No. 08/624,994, filed Mar. 29, 1996, now U.S. Pat. No. 5,795,078.

BACKGROUND OF THE INVENTION

The present invention relates to stabilizer, and more particularly to a rotary and angular movement balanceable assembly which is installed between a thrust receiving unit and a thrust applying unit, so as to rotatably support the thrust applying unit and enable the thrust applying unit to have both rotary and angular movement while a loading force is applied by the thrust applying unit to the thrust receiving unit.

Conventional bearing for bearing thrust force is thrust bearing which can bear an axial loading force derived from one specific direction only during rotation. Although such thrust bearing enables a loading applying piece to rotate along its axis, the axis of the loading applying piece must be concentric with the axis of the loading bearing piece to avoid getting stuck. Accordingly, the conventional thrust bearing can not provide angular movement.

A conventional ball and socket joint can allow angular movement between two elements connecting with the ball unit and the socket unit respectively. However, it is a simply dynamic theory that the frictional force between two contact objects will increase when the loading force which is perpendicularly applied to the contact objects increases. Thus, when a relatively heavy loading force is applied to such ball and socket joint, it will be stuck and lose its rotary and angular movement ability due to the frictional force formed between the ball surface and the socket race.

Accordingly, it is highly desirable in mechanic arrangement to have a novel device which is able to install between a thrust receiving unit and a thrust applying unit so as to rotatably support the thrust applying unit and enable the thrust applying unit to have both rotary and angular movement even that a relatively heavy loading force is applied by the thrust applying unit to the thrust receiving unit.

For example, when a transportation means such as a vehicle, a ship or an aircraft inclined aside in high speed advancing, the seats installed therein will synchronously incline that may cause the passengers feeling uncomfortable and even dizzy. Such situation can be avoided if the seats in an inclined transportation means are able to self-adjust and maintain in horizontal position. Since a heavy load, the weight of the passenger, is applied to the seat, the conventional thrust bearing or ball and socket joint is unable to solve such problem.

Furthermore, for example, a water buoy should be floating on water and supporting a tower by means of a float to indicate shallow area, shoal or reef in sea for the traveling ships and boats. In fact, the upright tower of the buoy may incline and swing left and right following the continuous sea waves that may affect its indicating performance. Neither installing a conventional thrust bearing nor a ball and socket joint between the float and the tower of a buoy can avoid such swinging phenomenon because the thrust bearing can not balance a swinging movement and the tower has a heavy weight which may cause the ball and socket joint being malfunctioned.

Many examples in our daily life may cause inconvenience due to unexpected rotary and angular movement. A balancer which can stabilize and balance such rotary and angular movement under loading is thus highly desirable to improve our living condition.

SUMMARY OF THE PRESENT INVENTION

A main object of the present invention is to provide a rotary and angular movement balanceable assembly which is installed between a thrust receiving unit and a thrust applying unit so as to rotatably support the thrust applying unit and enable the thrust applying unit to have both rotary and angular movement while a loading force is applied by the thrust applying unit to the thrust receiving unit.

Another object of the present invention is to provide a rotary and angular movement balanceable assembly, which is installed between a thrust receiving unit and a thrust applying unit, capable of stabilizing and balancing the rotary and angular movement of the thrust receiving unit and maintaining the thrust applying unit in balance position or its horizontal position.

Accordingly, a rotary and angular movement balanceable assembly of the present invention comprises a first balancer member, a second balancer member, a ball bracket affixed to the second balancer member, a plurality of balls, and a supporting means. The first balancer member has a circular concave race surface and defines a receiving cavity over the circular concave race surface. The ball bracket has a circular convex outer surface having a radian equal to the radian of the circular concave race surface. On the circular convex outer surface of the ball bracket, a plurality of retaining apertures are formed uniformly. The plurality of balls are uniformly distributed and retained over the circular convex outer surface of the ball bracket in such a manner that a portion of each ball extends through the corresponding aperture to expose outside while permitting rolling movement. The second balancer member is mounted on the first balancer member by means of the supporting means in which the circular convex outer surface of the ball bracket is abutted upon the circular concave race surface of the first balancer member with the plurality of balls rolling contact with the circular concave race surface of the first balancer member. Thereby, the second balancer member is able to process rotary and angular movement in respect with the first balancer member.

According to an alternative mode of the present invention, a rotary and angular movement balanceable assembly comprises a first balancer member, a second balancer member, a ball bracket affixed to the first balancer member, a plurality of balls, and a supporting means. The second balancer member has a circular convex outer surface. The ball bracket has a circular concave outer surface having a radian equal to the radian of the circular convex outer surface of the second balancer member. On the circular concave outer surface of the ball bracket, a plurality of retaining apertures are formed uniformly. The plurality of balls are uniformly distributed and retained over the circular concave outer surface of the ball bracket in such manner that a portion of each ball extends through the corresponding aperture to expose outside while permitting rolling movement. The second balancer member is mounted on the first balancer member by means of the supporting means in which the circular convex surface of the second balancer member is abutted upon the circular concave surface of the ball bracket with the plurality of balls rolling contact with the circular convex surface of the second balancer member. Thereby, the second balancer member is able to process rotary and angular movement in respect with the first balancer member.

DETAILED DESCRIPTION OF THE PREFERRED EMBODIMENT

Figure 1:
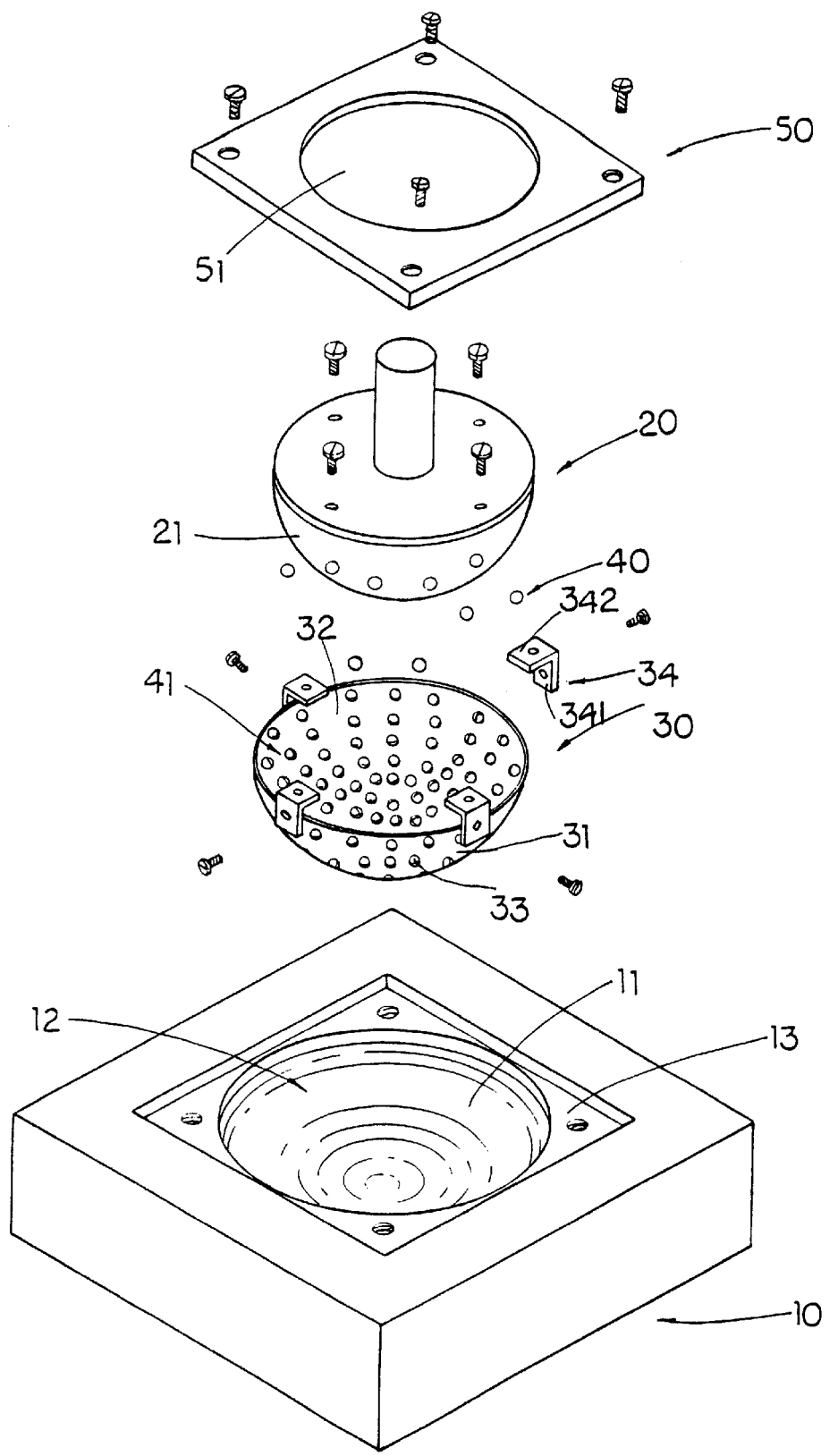
FIG. 1 is an exploded perspective view of a first preferred embodiment according to the present invention.

Referring to FIG. 1 of the drawings, a rotary and angular movement balanceable assembly according to a first preferred embodiment of the present invention comprises a first balancer member 10, a second balancer member 20, a ball bracket 30 concentrically affixed to the second balancer member 20, a plurality of identical balls 40, and a supporting means 50.

The first balancer member 10 has a circular concave race surface 11 and defines a receiving cavity 12 over the circular concave race surface 11. The ball bracket 30 has a circular convex outer surface 31 and a circular concave inner surface 32 both having a radian equal to the radian of the circular concave race surface 11 of the first balancer member 10. On the circular convex outer surface 31 of the ball bracket 30, a plurality of ball tracks 33 are formed uniformly.

The second balancer member 20 has a circular convex race surface 21 having the same radian of the circular concave inner surface 32. A ball receiving chamber 41 is defined between the circular convex race surface 21 of the second balancer member 20 and the circular concave inner surface 32 of the ball bracket 30. The depth of the ball receiving chamber 41, i.e. the distance between the circular convex race surface 21 and the circular concave inner surface 32, should be slightly larger than the radius of the balls 40.

The plurality of balls 40 are uniformly distributed and arranged over the circular convex outer surface 31 of the ball bracket 30 by retaining in the ball tracks 33 respectively within the ball receiving chamber 41, in which the balls 40 are rollingly movable in the ball tracks respectively. Each ball is in touch with the circular convex race surface 21 of the second balancer member 20 and a portion of each ball 40 extends through the corresponding ball track 33 to expose outside while permitting rolling movement.

The second balancer member 20 is mounted on the first balancer member 10 by means of the supporting means 50 in which the circular convex outer surface 31 of the ball bracket 30 is placed in the receiving cavity 12 and abutted upon the circular concave race surface 11 of the first member 10 with the plurality of balls 40 in rolling contact with the circular concave race surface 11 of the first balancer member 10.

In accordance with the present first embodiment, the ball bracket 30 is a circular arch-shaped retainer with a thin uniform thickness. The plurality of ball tracks 33 are a plurality of equally spaced ball retaining round apertures 33 having a diameter slightly smaller than the diameter of the balls 40 for maintaining the alignment and equal spacing of the balls 40 while permitting rolling movement of the balls 40. Therefore, approximately less than half portion of each ball 40 is allowed to penetrate through the corresponding round aperture 33 to expose out of the ball bracket 30 while more than half portion of each ball 40 is retained within the ball chamber 41.

A predetermined number of L-shaped mounts 34 are used to mount the ball bracket 30 on the second balancer member 20. Each mount 34 has a vertical portion 341 and a horizontal portion 342, wherein the vertical portions 341 are secured to the upper portion of the ball bracket 30 in equally spaced manner and the horizontal portions 342 are extended inwardly for screwing to the periphery edge of the top side of the second balancer member 20.

The top surface of the first balancer member 10 provides a recess 13 having, a size larger than the receiving cavity 12. The supporting means 50 is a cover board having the size of the recess 13. The cover board supporting means 50 has a central hole 51 which has a diameter smaller than the diameter of the second balancer member 20. After the second balancer member 20 is placed in the receiving cavity 12 of the first balancer member 10, lock the supporting means 50 in the recess 13 by secrewing, in order to install the second balancer member 20 with the first balancer member 10.

Figure 2:
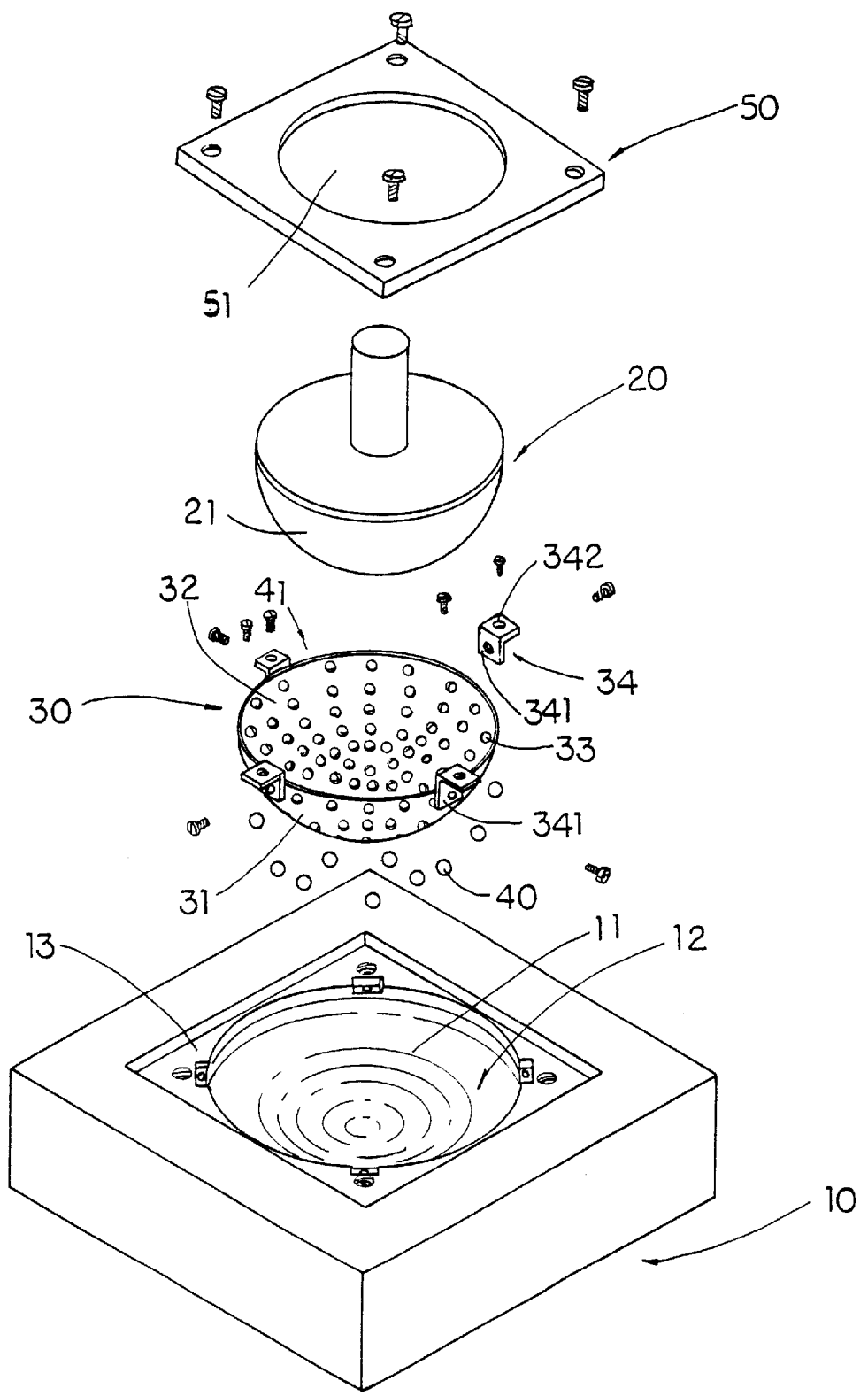
FIG. 2 is a perspective view of an alternative mode of the above first preferred embodiment according to present invention.

Referring to FIG. 2, an alternative mode of the above first embodiment is illustrated. The plurality of mounts 34 are secured to the ball bracket 30 by secrewing their vertical portion 341 to the upper portion of the ball bracket 30 and keeping their horizontal portions 342 extending outward. Therefore, The ball bracket 30 is adapted to disposed in the receiving cavity 12 by securing the horizontal portions 342 to the recess 13, i.e. the rim of the receiving cavity 12 of the first balancer member 10.

In this mode, the ball receiving chamber 41 is defined between the circular concave race surface 11 of the first balancer member 10 and the circular convex outer surface 31 of the ball bracket 30. The depth of the ball receiving chamber 41, i.e. the distance between the circular concave race surface 11 and the circular convex outer surface 31, should be slightly larger than the radius of the balls 40.

The plurality of balls 40 are uniformly distributed and arranged over the circular concave inner surface 32 of the ball bracket 30 and within the ball receiving chamber 41 by retaining in the round apertures 33 respectively, in which the balls 40 are rollingly movable about the round apertures 33. Each ball 40 is in touch with the circular concave race surface 11 of the first balancer member 10 and a portion of each ball 40 extends through the corresponding round aperture 33 to expose outside while permitting rolling movement.

After the second balancer member 20 is placed in the first balancer member 10, lock the cover board supporting means 50 in the recess 13 by secrewing, so that the second balancer member 20 is installed with the first balancer member 10.

In accordance with the aforesaid first embodiment and its alternative mode, the first balancer member 10 can be installed to a thrust receiving unit and the second balancer member 20 can be installed to a thrust applying unit, so as to connect the thrust receiving unit and the thrust applying unit together. Since the actual contact between the first and second balancer members 10, 20 are the rolling contact of the balls 40 with the circular concave race surface 11 of the first balancer member 10 and the circular convex race surface 21 of the second balancer member 20, the frictional contact area is limited to the point contact between the balls 40 and the circular convex race surface 21 and the circular concave race surface 11 In addition, all the balls 40 are rotatably installed, therefore, the frictional force between the balls 40, the first balancer member 10 and the second balancer member 20 is minimized.

When the thrust applying unit bears a loading force, the loading force will apply to the first balancer member 10 and the thrust receiving, unit via the second balancer member 20. Since the frictional moments between the first and second balancer members 10, 20 are minimized by the rolling balls 40 as mentioned above, relative rotatable and angular movement of the first and second balancer members 10, 20 is able to carry out smoothly.

Figure 3:
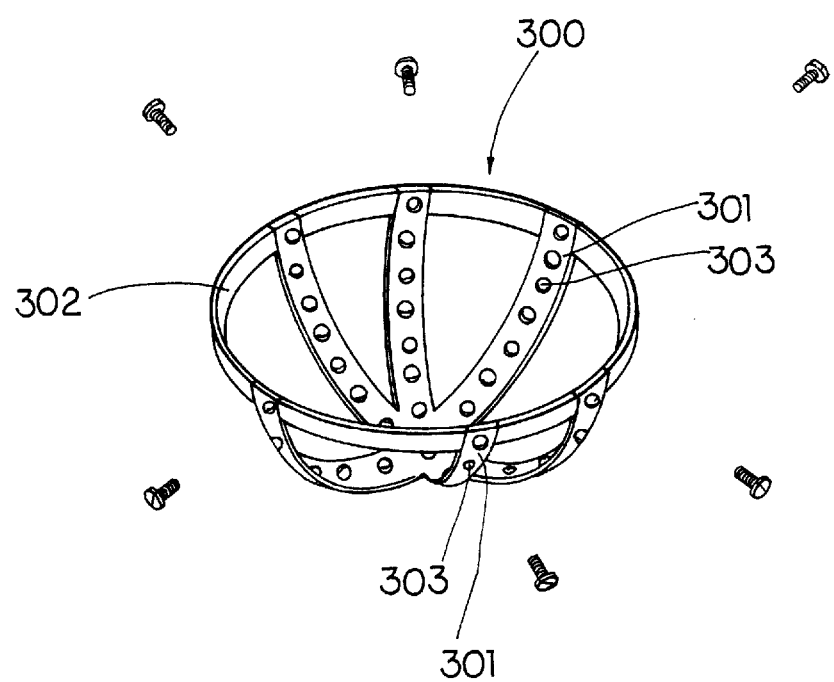
FIG. 3 is a perspective view of an alternative mode of the ball bracket of the present invention.

Referring to FIG. 3, an alternative mode of the ball bracket is illustrated. A modified ball bracket 300 is constituted by a plurality of arch-shaped retainer strips 301 radially connected at their bottom central portion and radially extended outwardly and upwardly. The two ends of each retainer strip 301 are attached to a constructive circular strip 302 to form a bowl or disc shape integral body. Additionally, each retainer strip 301 has a plurality of equally spaced retaining apertures 303 thereon for arranging the balls 40 between, and in rolling contact with, the circular concave race surface 11 of the first balancer member 10 and the circular convex race surface 21 of the second balancer member 20 as described in the first embodiment.

Figure 4A:
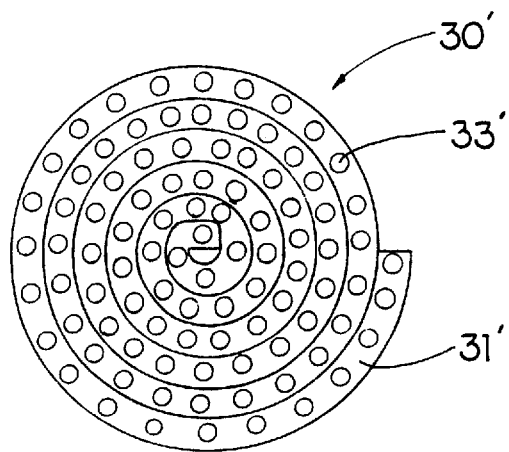
FIGS. 4A and 4B are plan views of another two alternative modes of the ball bracket of the present invention.
Figure 4B:
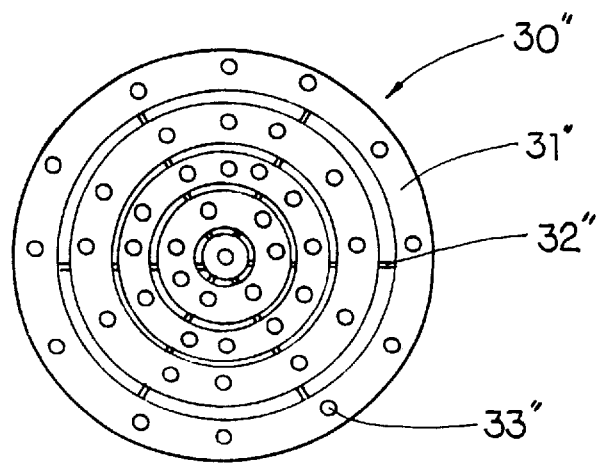

FIGS. 4A and 4B illustrate two further alternative modes of the ball bracket of the present invention. In FIG. 4A, a modified ball bracket 30' is made by a spiral coiling retainer strip 31' to form a circular arch-shaped body with a plurality of ball retaining apertures 33' formed thereon in equal spacing manner. In FIG. 4B, a modified ball bracket 30" is made of a plurality of round retainer strips 31" having different diameter. The round retainer strips 31" are arranged from small to large concentrically and are connected by a plurality of connecting rods 32" underneath to form a circular arch-shaped integral body. Also a plurality of equally spaced ball retaining, apertures 33" are formed on each round retainer strip 31".

Figure 5:
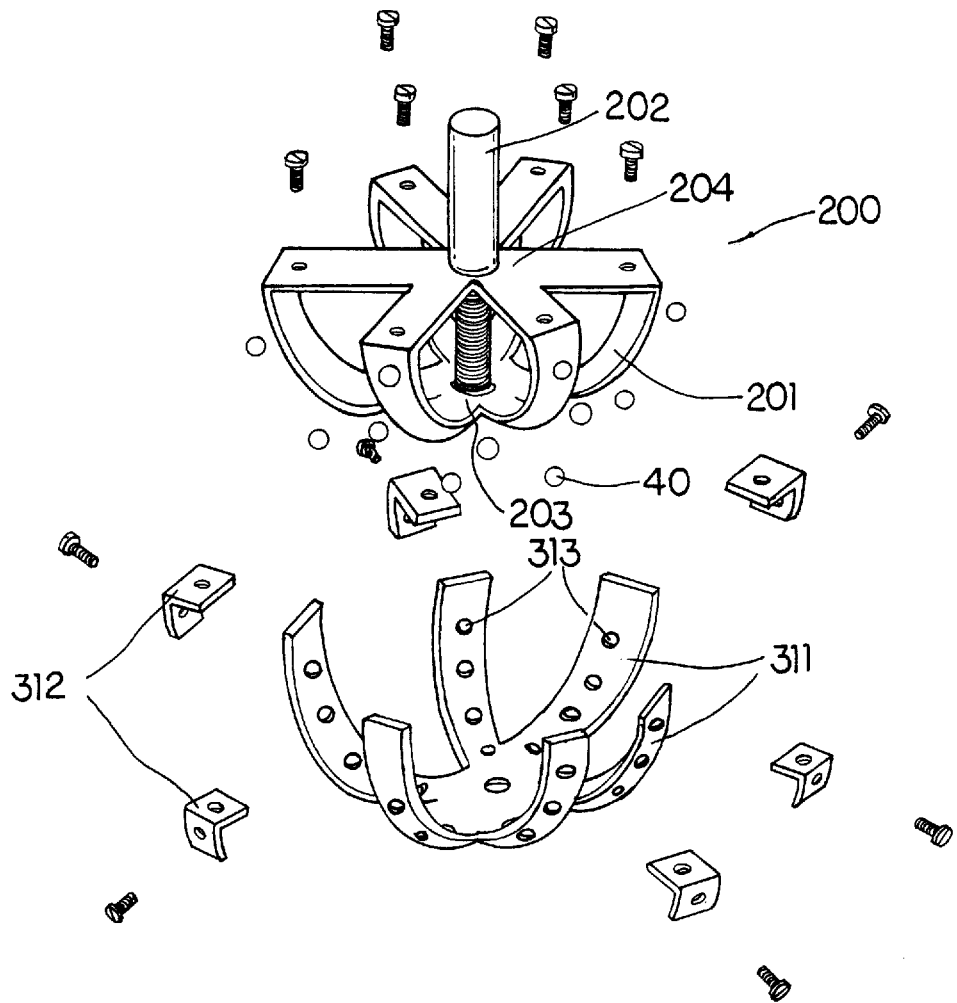
FIG. 5 is an exploded perspective view of an alternatively mode of the second balancer member and the incorporated ball bracket of the present invention.

Referring to FIG. 5, another alternative modes of a second balancer member 200 and a ball bracket 310 are illustrated. The modified second balancer member 200 is constructed by a plurality of equally spaced semi-round strips 201 jointed radially to form a bowl shape body with a central post 202 supporting between a curve bottom portion 203 and a top portion 204. The modified ball bracket 310 is similar to the above described modified ball bracket 300 that it is also constituted by a plurality of arch-shaped retainer strips 311 radially connected at their bottom central portion. A plurality of mounting pieces 312 are adapted for securing the ball bracket 310 with the semi-round strips 201 of the second balancer member 200. In addition, each retainer strip 311 has a plurality of equally spaced ball retaining apertures 313 thereon for retaining the balls 40 between the outer curve surfaces of the semi-round strips 201 and the ball retaining apertures 313 of the arch-shaped retainer strips 311 in rotatable manner.

Figure 6:
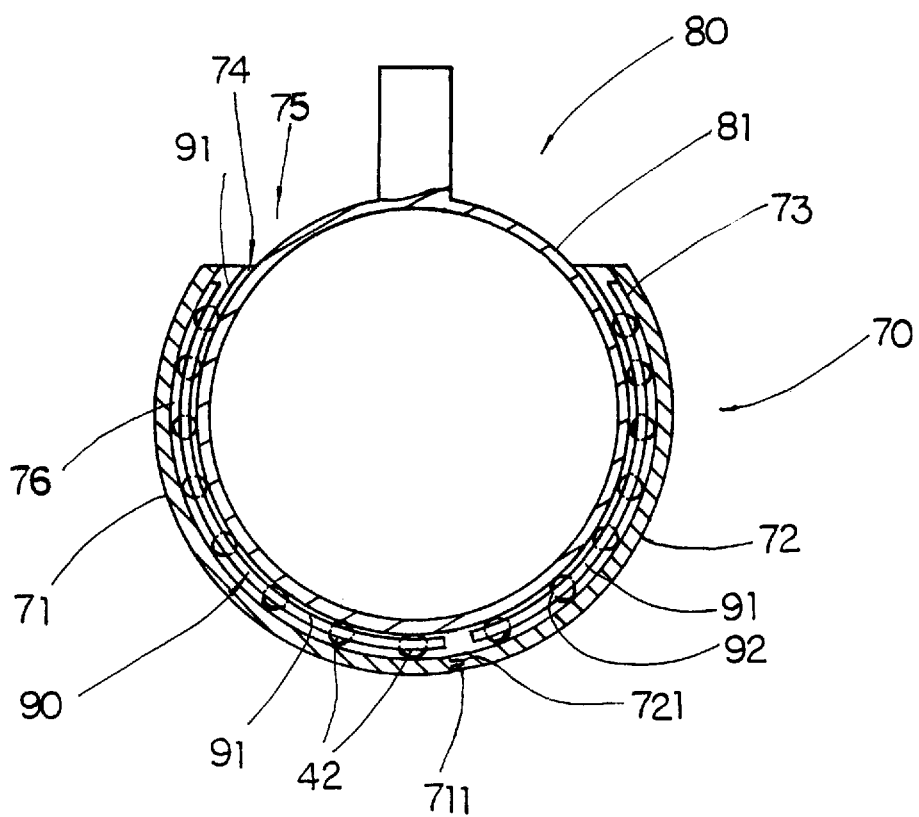
FIG. 6 is an exploded perspective view of a second preferred embodiment according to the present invention.

FIG. 6 illustrates a rotary and angular movement balanceable assembly of a second preferred embodiment according to the present invention, which comprises a first balancer member 70, a second balancer member 80, a ball bracket 90, and a plurality of identical bearing balls 40.

The first balancer member 70 comprises a male semi-spherical housing 71 and a female semi-spherical housing 72. The edge of the male semi-spherical housing 71 protrudes a plurality of projections 711 and the edge of the female semi-spherical housing 72 forms a plurality of holes 721. The male and female semi-spherical housings 71, 72 are jointed edge to edge by inserting the projections 711 into the holes 721 respectively to form a hollow spherical body which has an opening 75 and defines a spherical inner race surface 73 and a spherical receiving cavity 74 inside.

The second balancer member 80 is a spherical body having a spherical outer race surface 81 and embedding in the receiving, cavity 74 of the first balancer member 70. The ball bracket 90 comprises a plurality of circular retainer strips 91 mounted on the male and female semi-spherical housings 71, 72 respectively. Each of the retainer strips 91 has a plurality of equally spaced ball retaining apertures 92 and is arranged to align uniformly along the curvature of the spherical inner race surface 73 as shown in FIG. 6. Between each retainer strip 91 and the spherical inner race surface 73 of the first balancer member 70, an uniform space is formed, wherein the distance between each retainer strip 91 and the spherical inner race surface 73 should be slightly larger than the diameter of the balls 40. Therefore, a receiving chamber 76 is defined between the ball bracket 90 and the spherical inner race surface 73 of the first balancer member 70 for retaining the plurality of balls 40 therebetween. The balls 40 are in rolling contact with the spherical inner race surface 73 and rotatably mounted in position by means of the plurality of the retaining apertures 92 respectively.

Accordingly, the first balancer member 70 can be mounted on a thrust receiving unit and the second balancer member 80 can be connected with a thrust applying unit so as to connect the thrust receiving unit and the thrust applying unit together. Since the frictional moments between the first and second balancer members 70, 80 is minimized by the rolling balls 40 as mentioned above, even the second balancer member 80 is heavily loaded, it is still able to process a rotary and angular movement in respect with the first balancer member 70 smoothly.

Figure 7:
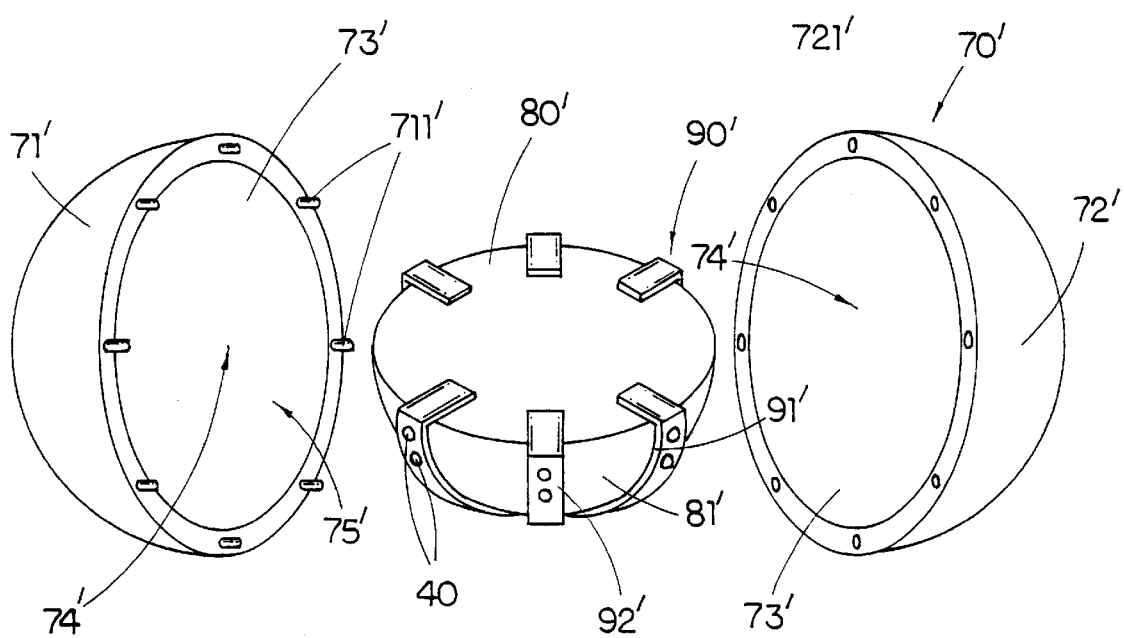
FIG. 7 is an exploded perspective view of a third preferred embodiment according to the present invention.

Referring to FIG. 7, a rotary and angular movement balanceable assembly of a third preferred embodiment according to the present invention is illustrated, which comprises a first balancer member 70' a second balancer member 80' a ball bracket 90' and a plurality of identical bearing balls 40.

The first balancer member 70' comprises a male semi-spherical housing 71' and a female semi-spherical housing 72' integrally attached to form a hollow spherical body by means of the projections 711' and holes 721' configuration as disclosed in the above second embodiment. The interior spherical surface of the first balancer member 70' acts as a spherical inner race surface 73'. Moreover, a spherical receiving cavity 74' is defined inside the spherical first balancer member 70'.

The second balancer member 80' is a weighted bowl shape body having a convex outer race surface 81'. The second balancer member 80' is disposed within the spherical receiving cavity 74' of the first balancer member 70'. The ball bracket 90' comprises a plurality of curved retainer strips 91' uniformly mounted on the convex outer race surface 81' of the second balancer member 80'. Each of the retainer strips 91' has a plurality of equally spaced ball retaining apertures 92' as shown in FIG. 7. Between each retainer strip 91' and the convex outer race surface 81' of the second balancer member 80' an uniform space is formed, wherein the distance between each retainer strip 91' and the convex outer race surface 81' should be slightly larger than the diameter of the balls 40. Therefore, a receiving chamber 76' is defined between the ball bracket 90' and the convex outer race surface 81' of the second balancer member 80' for retaining the plurality of balls 40 therebetween. The balls 40 are in rolling contact with the convex outer race surface 81' and rotatably mounted in position by means of the plurality of the retaining apertures 92' respectively.

Since the frictional moments between the first and second balancer members 70', 80' are minimized by the rolling balls 40 as mentioned above, the weighted second balancer member 80' can remain in upright position during the rotation movement of the spherical first balancer member 70'.

Figure 8:
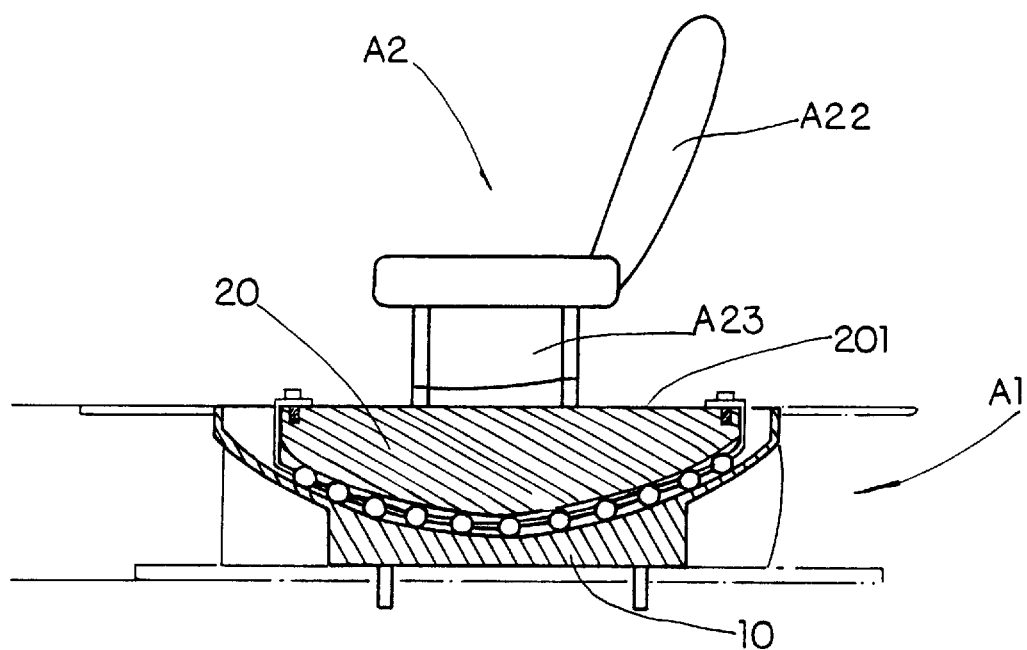
FIG. 8 is a sectional view of a fourth preferred embodiment according to the present invention.
Figure 9:
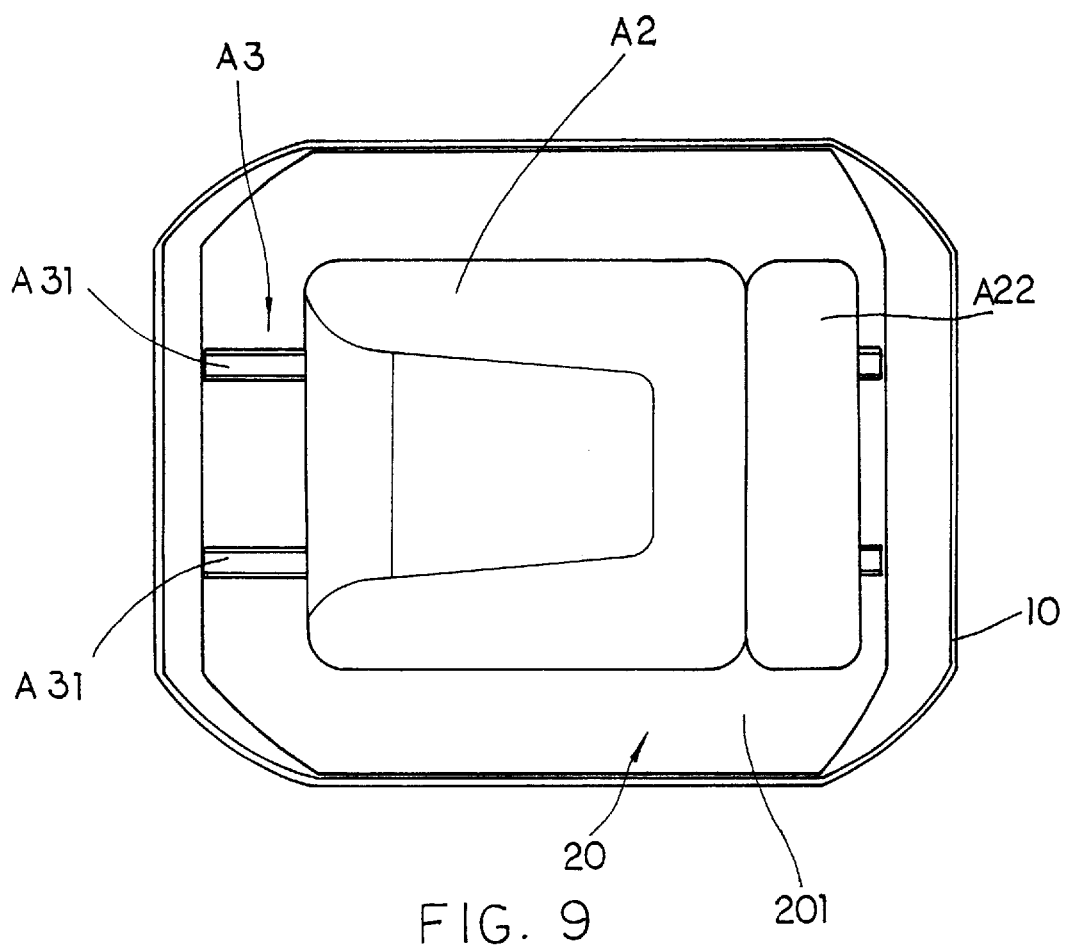
FIG. 9 is a plan view of the above fourth embodiment according to the present invention.
Figure 10:
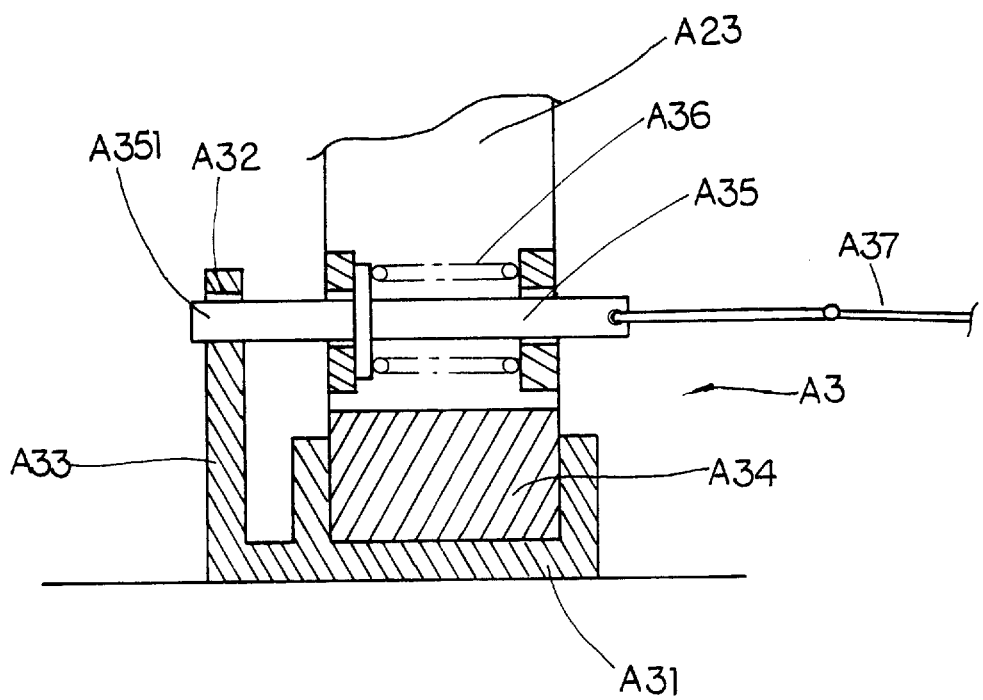
FIG. 10 is a sectional end view of a locking mechanism of the above fourth embodiment according to the present invention.

As illustrated in FIGS. 8, 9 and 10 is a fourth preferred embodiment of the present invention. The fourth embodiment discloses a practical application of the rotary and angular movement balanceable assembly of the present invention, in which the thrust receiving unit is a ground A1 of a vehicle and the thrust applying unit is a seat A2 of the vehicle. A rotary and angular movement balanceable assembly as disclosed in the above first embodiment is incorporated with this fourth embodiment.

The first balancer member 10 is installed in the ground A1 of the vehicle. The top surface 201 of the second balancer member 20 is arranged in the same level of the ground A1. (If the seat A2 is merely firmly affixed on the top surface 201 of the second balancer member 20, such seat A2 will become a rocking chair which not only can swing fore and back, but also can swing left and right.) In accordance with the present fourth embodiment, the seat A2 which has a sitting seat A21 and a seat back A22 is installed on the top surface 201 of the second balancer member 20 by means of a locking mechanism A3 (as shown in FIG. 10).

When the vehicle is traveling on an inclined road surface or around a corner, the vehicle, as well as the first balancer member 10, may trend to incline for certain angle. While the tilting moment of force larger than the static frictional force between the first and second balancer members 10, 20, the second balancer member 20, the seat A2 and the passenger on the seat A2 will remain stably balanced in upright position by the angular movement of the second balancer member 20 in respect with the first balancer member 10 in a direction opposite to the inclined direction of the first balancer member 10. Therefore, the uncomfortable and dizzy feeling of the passenger can be avoided.

The sitting inclined angle of the seat A2 can also be adjusted by incorporating the rotary and angular movement balanceable assembly of the present invention with the locking mechanism A3 according to this fourth embodiment. As shown in FIG. 9, the locking mechanism A3 comprises a pair of parallel sliding rails A31 secured on the top surface 201 of the second balancer member 20. Referring to FIG. 10, each of the sliding rails A31 provides a plurality of locking holes A32 aligned on an outer frame A33 thereof A pair of parallel guiders A34 are secured to the bottom base A23 of the seat A2 and are slidably engaged in the two sliding rails A31 respectively. The locking mechanism A3 further comprises two locking rod A35 which are slidably mounted on the two guiders A34 and have two locking end portions A351 extending to insert into the two locking holes A32 respectively, two compressive strings A36 are mounted on the two locking rod A35 respectively to provide a pressing force to the two locking rods A35 for keeping the ends of the two locking rods A35 inserted into the two locking holes A32 respectively, and a controlling arm A37 having two ends connecting to the other ends of the two locking rods A35 respectively.

Accordingly, by pulling the a controlling arm A37 to compress the two springs A36, the two locking end portions A351 of the two locking rods A35 are pulled out of the two locking holes A32 respectively. At that moment, the seat A2 is able to move forward or backward for adjusting to a desired position. However, either the seat A2 is move forward or backward, the center of gravity may vary simultaneously that will cause the second balancer member 20 to rotate angular forwards or backwards. Thus, the seat A2 is driven as well to tilt forward or backward to alter its sitting inclined angle. Until the desired sitting inclined angle of the seat A2 is adjusted, the locking end portions of the two locking rods A35 can then be re-inserted to another pair of locking holes A32 respectively.

Figure 11:
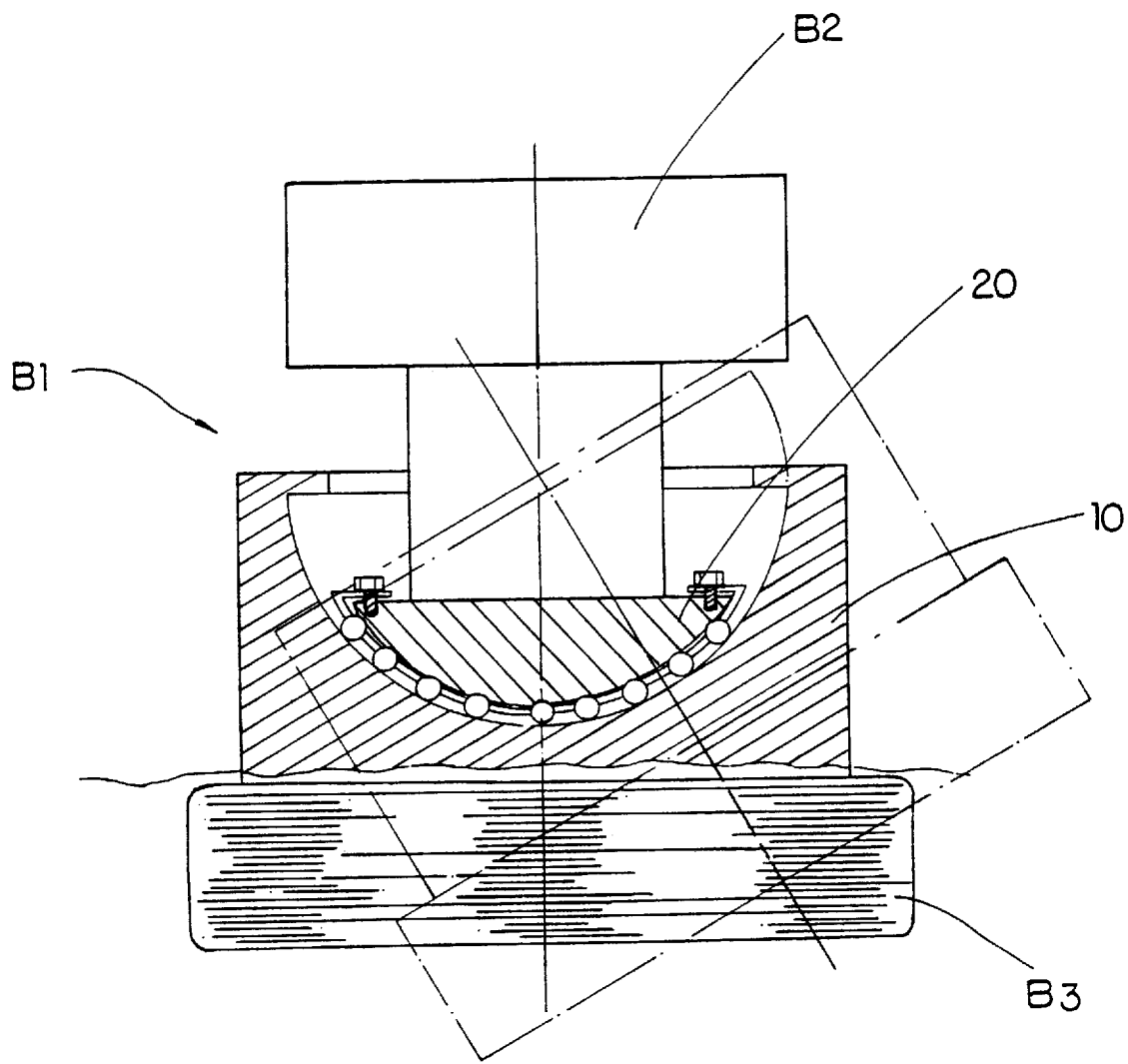
FIG. 11 is a sectional view of a fifth preferred embodiment according to the present invention.

Referring to FIG. 11, it is a fifth preferred embodiment of the present invention which illustrates another practical application of the rotary and angular movement balanceable assembly as disclosed in the above first embodiment. In this fifth embodiment, the rotary and angular movement balanceable assembly is installed in a water buoy B1. The thrust applying unit is a tower B2 of the buoy B1 which is secured to the second balancer member 20 and the thrust receiving unit is a float B3 of the buoy B1 to which the first balancer member 10 is embedded therein. In this example, the thickness of the second balancer member 20 should be smaller than the thickness of the first balancer member 10.

Accordingly, even the float B3 is driven to tilt in all direction by the sea waves, the heavy tower B2 is able to remain in upright position because of the rotary and angular movement of the second balancer member 20 in respect with the tilting first balancer member 10, as shown in the dotted lines in FIG. 11.

I claim:

1. A rotary and angular movement balanceable assembly, comprising a first balancer member which comprises a male semi-spherical housing and a female semi-spherical housing integrally connected with said male semi-sherical housing to form a hollow spherical body which has a spherical inner race surface and a spherical receiving cavity formed therein, said hollow shperical boby has an interior spherical surface acting as said spherical inner race surface;

a second balancer member having an outer race surface and disposing in said receiving cavity of said first balancer member;

a ball bracket which is mounted within said spherical receiving cavity of said first balancer member and has a plurality of equally spaced ball retaining apertures, said retaining apertures being arranged to align uniformly along the curvature of said spherical inner race surface of said first balancer member, so that a receiving chamber is defined between said ball bracket and said spherical inner race surface of said first balancer member; and a plurality of identical balls which are retained within said receiving chamber by means of said plurality of retaining apertures and are in rolling contact with said spherical inner race surface of said first balancer member and said outer race surface of said second balancer member.

2. A rotary and angular movement balanceable assembly, as recited in claim 1, wherein said first balancer member has an opening, said second balancer member being a spherical body and said outer race surface being a spherical outer race surface, said ball bracket comprising a plurality of circular retainer strips mounted on said male and female semi-spherical housings respectively, said plurality of retaining apertures being formed on each of said retainer strips respectively in an equally spaced manner.

3. A rotary and angular movement balanceable assembly, as recited in claim 2, wherein an edge of said male semi-spherical housing protrudes a plurality of projections and an edge of said female semi-spherical housing forms a plurality of holes, said male and female semi-spherical housings being jointed edge to edge by inserting said projections into said holes respectively.

4. A rotary and angular movement balanceable assembly, as recited in claim 2, wherein said first balancer member is mounted on a thrust receiving unit and said second balancer member is connected with a thrust applying unit so as to connect said thrust receiving unit and said thrust applying unit together.

5. A rotary and angular movement balanceable assembly, as recited in claim 4, wherein an edge of said male semi-spherical housing protrudes a plurality of projections and an edge of said female semi-spherical housing forms a plurality of holes, said male and female semi-spherical housings being jointed edge to edge by inserting said projections into said holes respectively.

6. A rotary and angular movement balanceable assembly, as recited in claim 1, wherein said second balancer member is a weighted bowl shape body having a convex outer race surface.

7. A rotary and angular movement balanceable assembly, as recited claim 6, wherein said ball bracket comprises a plurality of retainer strips uniformly mounted on said convex outer race surface of said second balancer member and said plurality of retaining apertures are formed on each of said retainer strips respectively in an equally spaced manner.

8. A rotary and angular movement balanceable assembly, as recited in claim 7, wherein said first balancer member is mounted on a thrust receiving unit and said second balancer member is connected with a thrust applying unit so as to connect said thrust receiving unit and said thrust applying unit together.

9. A rotary and angular movement balanceable assembly, as recited in claim 8, wherein an edge of said male semi-spherical housing protrudes a plurality of projections and an edge of said female semi-spherical housing forms a plurality of holes, said male and female semi-spherical housings being jointed edge to edge by inserting said projections into said holes respectively.

10. A rotary and angular movement balanceable assembly, as recited in claim 7, wherein an edge of said male semi-spherical housing protrudes a plurality of projections and an edge of said female semi-spherical housing forms a plurality of holes, said male and female semi-spherical housings being jointed edge to edge by inserting said projections into said holes respectively.

11. A rotary and angular movement balanceable assembly, as recited in claim 6, wherein an edge of said male semi-spherical housing protrudes a plurality of projections and an edge of said female semi-spherical housing forms a plurality of holes, said male and female semi-spherical housings being jointed edge to edge by inserting said projections into said holes respectively.

12. A rotary and angular movement balanceable assembly, as recited in claim 6, wherein said first balancer member is mounted on a thrust receiving unit and said second balancer member is connected with a thrust applying unit so as to connect said thrust receiving unit and said thrust applying unit together.

13. A rotary and angular movement balanceable assembly, as recited in claim 12, wherein an edge of said male semi-spherical housing protrudes a plurality of projections and an edge of said female semi-spherical housing forms a plurality of holes, said male and female semi-spherical housings being jointed edge to edge by inserting said projections into said holes respectively.

14. A rotary and angular movement balanceable assembly, as recited in claim 1, wherein said first balancer member is mounted on a thrust receiving unit and said second balancer member is connected with a thrust applying unit so as to connect said thrust receiving unit and said thrust applying unit together.

15. A rotary and angular movement balanceable assembly, as recited in claim 14, wherein an edge of said male semi-spherical housing protrudes a plurality of projections and an edge of said female semi-spherical housing forms a plurality of holes, said male and female semi-spherical housings being jointed edge to edge by inserting said projections into said holes respectively.

16. A rotary and angular movement balanceable assembly, as recited in claim 1, wherein an edge of said male semi-spherical housing protrudes a plurality of projections and an edge of said female semi-spherical housing forms a plurality of holes, said male and female semi-spherical housings being jointed edge to edge by inserting said projections into said holes respectively.

\* \* \* \* \*